UNITED STATES PATENT OFFICE.

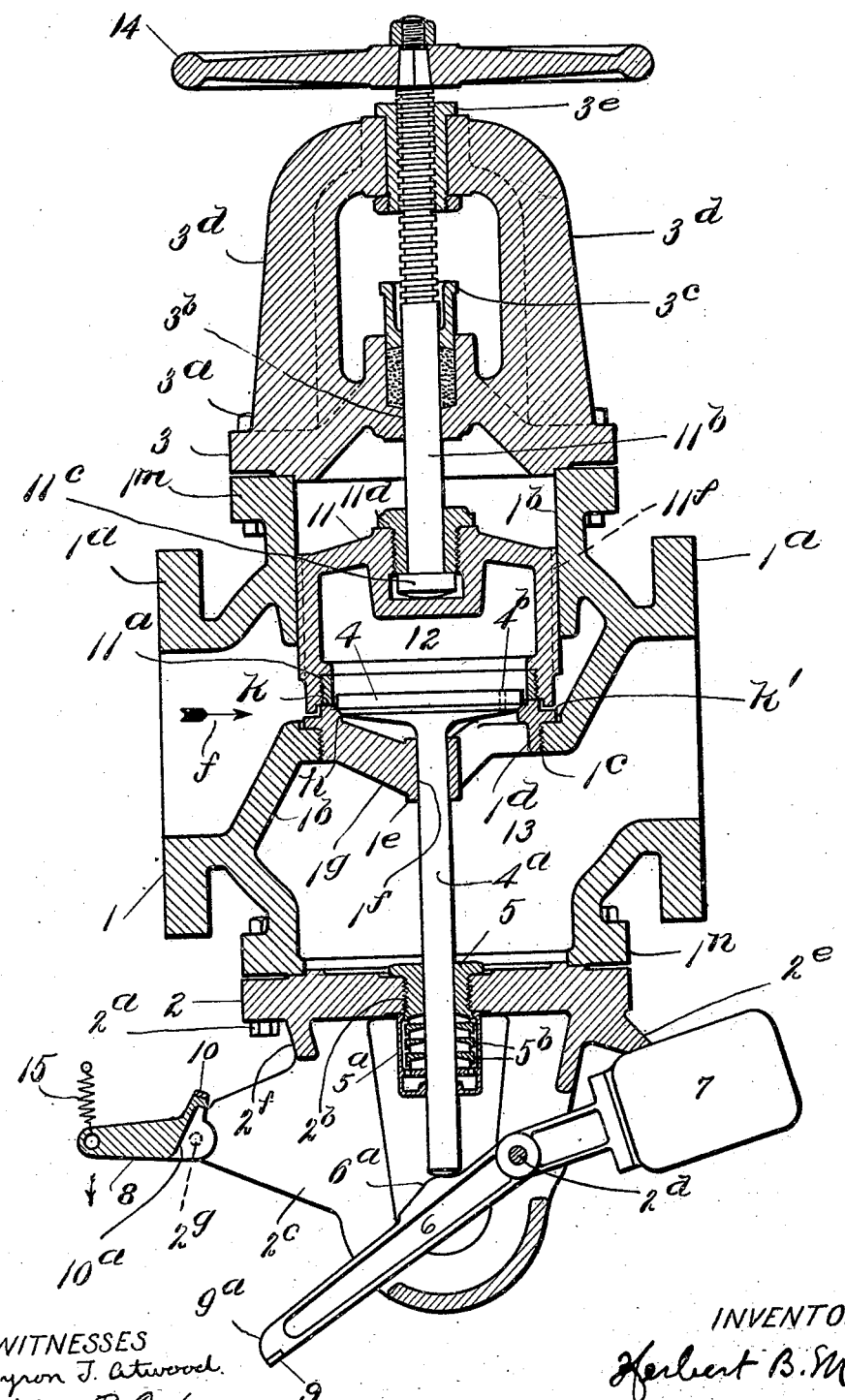

HERBERT B. MORRILL, OF SALEM, MASSACHUSETTS.

FLOW-CONTROL DEVICE.

1,419,640.  Specification of Letters Patent.  Patented June 13, 1922.

Application filed February 10, 1919. Serial No. 275,958.

*To all whom it may concern:*

Be it known that I, HERBERT B. MORRILL, a citizen of the United States of America, and resident of Salem, in the county of Essex and State of Massachusetts, have invented new and useful Improvements in Flow-Control Devices, of which the following is a specification.

This invention relates to apparatus adapted to control the flow of fluid under pressure in ducts, and more particularly to the control of pressure and flow in supply pipes leading to fluid-pressure motors such as steam turbines, engines, pumps, and other such devices, hereinafter mentioned generically as "motors"; or for use wherever it is necessary quickly to stop a flow of fluid by mechanical means, either automatically or by hand.

I am not aware of any wholly satisfactory device of the prior art adapted to the above purposes. Such a device essentially should comprise means adapted at least to rapid closure of the pipe or duct in emergencies, and able to respond by shutting off the flow of fluid with no loss of time upon the operation of the means relied upon to act when the conditions warrant stoppage, such as upon an indication controlled by a speed governor, or by a pressure gauge indicating an abnormal pressure; or, when manually controlled from a distance, to secure a shut-down of the motor by shutting off the steam or other fluid pressure intended to be controlled by the device. So far as I am aware the prior art devices either are expensive and complicated or are not adapted to be tripped to shut off the pressure by the slight energies capable of being transmitted by connections to automatic or hand operated emergency stopping means. In order to explain the invention I shall describe means adapted to be contained in a unitary valve casing and comprising both a wheel-operated or screw throttle valve for the normal manual control of flow of the pressure fluid, and a trip-operated valve adapted to close the opening controlled by the hand-operated throttle, the respective valves being so related as to enable the trip-valve to be automatically reset after actuation, and so to permit the motor to be started manually after an emergency stop without manually interfering with the automatic elements of the device.

A principal object of the invention is to provide means for controlling the flow of fluid under pressure characterized by effective simplicity and the reliable automatic action of means for suddenly closing the duct. Other objects are to economize in the number of parts employed for the device, to render the automatic or emergency elements of the valve capable of being operated by a minimum motion of a trip or latch so constructed as to be readily movable by light energies transmitted to it from a rod, string, wire, an electromagnet or a pneumatically actuated device automatically or manually controlled upon any occasion to shut off the flow of the pressure fluid; and to provide a durable device able to be operated by the unskilled without derangement or damage.

I have illustrated the genus of my invention by a specific instance adapted to control a large flow into a heavy prime mover such as a steam turbine in a stationary or marine power plant, but it will be understood that the form selected for illustration is explanatory only of the invention, which may be embodied in many other specific forms.

In the accompanying drawing the figure is a vertical central section through a valve casing and valve embodying the invention.

Referring to the figure (which shows the relative position of the parts immediately after the closure of the manually operated valve 11, the automatic valve 4 previously having been closed), the valve casing 1 may be a heavy casting substantially in the form shown having flanges 1ª for attachment respectively to the supply pipe and to the entrance pipe of the motor.

Centrally in the casing 1 the usual septum or partition 1ᵇ is provided with a threaded opening 1ᶜ in which an exteriorly threaded valve seat member 1ᵈ is seated. The member 1ᵈ may be an annulus or spider having a central boss 1ᵉ centrally bored at 1ᶠ for a bearing for a valve stem presently mentioned, the boss 1ᵉ being supported on the usual arms 1ᵍ. The member 1ᵈ is provided on its upper face with a seat $h$ preferably conical and is also provided exterior of the seat $h$ with a seat $k$, preferably constituting a plane upper face of the member 1ᵈ, for another valve.

The seat $k$ as shown is the seat for the manually controlled throttle valve, and may be provided with a stepped outer portion $k'$ for the usual purpose of preventing damage by wire-drawing flow past the seat surface proper.

The valve seats $h$ and $k$ respectively receive an automatic valve 4, shown as a poppet-valve, and a manually operated throttle valve 11. Valve 4 is provided with a conical face to fit the seat $h$ and with a depending, preferably integral, stem $4^a$ bearing in the guide opening $1^f$ of the seat member $1^d$ and in the gland 5. The poppet head of valve 4 is provided with a leakage-hole of small area at some part of its surface, for instance at $4^b$.

Throttle valve 11 may either rotate with its stem or be guided to move in an upper bore $1^p$ of the casing 1, or be free to rotate both with respect to its stem and with respect to the bore $1^p$ as shown. Preferably the valve 11 is of the type illustrated having a relatively large internal cylindrical chamber 12 and having an attached separate face member $11^a$ machined to fit upon the seat $k$.

The valve stem $11^b$ is headed at $11^c$ and fastened to the valve 11 by a threaded sleeve $11^d$ taking into an enlarged bore in the upper wall of valve 11. By-pass channels $11^f$ are provided to equalize pressures above and below the valve 11.

The direction of flow for the valve casing 1 may be the direction of the arrow $f$, and on the side of the casing toward the pressure operated engine or pump the casing provides a chamber 13, which when the throttle valve 11 and automatic valve 4 are both open is substantially at the pressure of the pipe which these valves are adapted to control.

Casing 1 preferably is constructed with top and bottom flanges $1^m$, $1^n$, adapted to receive in fitting relation suitable closure supporting the guides for the respective valves in the casing 1.

The lower cover 2, for instance, is fastened on the flange $1^n$ by bolts $2^a$, and comprises a central threaded opening $2^b$ in which is screwed a gland 5, which may if desired carry a housing $5^a$ for packing rings $5^b$. The cover 2 may be rotated to any desired position for the trip elements preferably carried by it.

The cover 2 has formed integrally therewith or attached thereto a trip-lever frame $2^c$, preferably of the form shown and providing at $2^d$ a transverse pivot shaft for a lever 6, 7, the arm 7 being over-weighted with respect to the arm 6 and carrying a cam shaped lug $6^a$ bearing on the end of valve stem $4^a$ in line with the central opening of the gland 5 and housing $5^a$. Arm 6 is provided at its end with an upper bevel $9^a$ and with a machined wear-plate 9. The cover 2 is provided with integral or attached lugs $2^e$ $2^f$ constituting limit stops for the lever 6, 7.

The frame member $2^c$ of the cover 2 also carries near the upper end of the arc swept by the arm 6 of the lever 6, 7 pivot holes for aligned pivot lugs $2^g$ of a latch member shown as a bell-crank lever 8, 10, the arm 10 having thereon a machined upper surface for cooperation with the plate 9 of the lever arm 6, and being cut away in the plane of lever arm 6 at $10^a$. The arrangement is such that in one position the latch 8 may engage under and hold up the arm 6 of the lever 6, 7.

The other end of the casing 1 is closed by a cover 3 fastened on the flange $1^m$ by suitable bolts $3^a$, and providing a central guide opening $3^b$ and a suitable packing gland $3^c$. The cover 3 may also carry a heavy arch $3^d$ having therein a central nut $3^e$ for the threaded valve stem $11^b$. The hand wheel 14 is provided to control the stem $11^b$.

In operation, assuming the hand-operated throttle 11 to be closed upon its seat $k$, any residual pressure in the chamber 13 or the motor controlled by the device is equalized through the hole $4^b$ with the pressure in the internal chamber 12 of the valve 11.

The pressure active to hold the valve 4 on its seat under these circumstances is only the residual pressure in the chambers 12, 13 as effective upon the small cross-sectional area of the stem $4^a$.

The overweighted end 7 of the lever 6, 7, is sufficient to overcome this pressure and the weight of valve 4, and whenever the throttle valve 11 is closed the valve 4 is lifted off its seat by the action of lever 6, 7, and is locked in this position by arm 10 of latch lever 8, 10, taking under the plate 9 on the arm 6 of the lever 6, 7. Latch lever 8 is normally held in this position, as by a light spring 15, the bevel $9^a$ of arm 6 moving the lever 8, 10 to permit arm 6 to pass to locking position.

The throttle valve 11 may now be opened to start the turbine or motor. Pressure in the chamber 13 promptly rises to the operative pressure for the motor and pressure in the chamber 12 is soon equalized with that in the chamber 13. The valve 4 is thus placed under a tendency to close upon its seat measured by the cross sectional area of its stem $4^a$ and the pressure in the chambers 12, 13. For usual conditions this is a considerable force, sufficient to move the valve 4 promptly upon its seat $h$ upon the release of its lever 6, 7.

It is obvious that upon tripping the latch 8 the valve 4 will close upon its seat and stop the flow through the casing 1, whatever the open position of the throttle 11. When this has happened the valve 4 can not be opened until throttle 11 has been closed, but when valve 11 is closed, the valve 4 is automatically reset by the action of the weight 7. When stoppage is effected by valve 4, leakage through the passage 4$^b$ occurs, but is negligibly small in comparison with an operative flow to the motor.

The latch 8, 10 may be controlled in any desired way, for instance by a centrifugal governor controlled by the speed of the motor; by a cord or wire connection to be manually operated by levers or pull-rings distributed through the power plant; or by electro-magnetically or pneumatically controlled connections to emergency-stop buttons distributed as desired. Suitable connections for operating such a latch as parts 8, 10 are well known in the art, form no part of my invention, and in consequence are not illustrated.

I claim:

1. A flow control device having therein a plurality of valve-members controlling the same flow passage, means tending to open one of said valve members on closure of another, means for holding open said first mentioned valve member, said first mentioned valve member being adapted to be closed by fluid pressure when released by said holding means.

2. A flow control device having therein a manually-operable throttle-valve and a valve adapted independently to control the same passage for fluid, means for automatically opening said valve when said throttle-valve is closed, said valve being normally urged toward closed position by the fluid pressure when said throttle valve is open, and means for holding said valve open adapted to be tripped to allow said valve to close.

3. Flow control apparatus having therein a duct, a throttle-valve, a seat therefor, and means adapted to seat and unseat said throttle valve to close and open said duct, in combination with an automatic valve and a seat therefor for substantially closing said duct when said automatic valve is seated, means tending to unseat said automatic valve when said throttle-valve is seated, and means including a space between said valves accessible to fluid pressure in said duct for over-balancing the unseating means for said automatic valve when said throttle valve is open.

4. Flow control apparatus having therein a duct, a throttle-valve, a seat therefor, and means adapted to seat and unseat said throttle valve to close and open said duct, in combination with an automatic valve and a seat therefor for substantially closing said duct when said automatic valve is seated, means tending to unseat said automatic valve when said throttle-valve is seated, and means including a space between said valves accessible to fluid pressure in said duct for over-balancing the unseating means for said automatic valve when said throttle valve is open, and means adapted to be made inoperative in order to close the duct reacting when operative with said automatic valve to hold it open against said overbalancing pressure.

5. Flow-control apparatus having therein a duct for fluid under pressure, a throttle-valve, a seat therefor, and means adapted to seat and unseat said throttle-valve to close and open said duct, in combination with an automatic valve and a seat therefor for substantially closing said duct when said automatic valve is seated, means tending to unseat said automatic valve when said throttle valve is seated, and means including a chamber in the throttle valve accessible to fluid pressure in said duct, and adapted to be entered by said automatic valve when unseated, for overbalancing the unseating means for said automatic valve when said throttle-valve is open.

6. Flow control apparatus for fluid pressure ducts having therein a manually controlled throttle valve, and an automatic valve adapted to close the same duct under pressure of the fluid flowing therein, in combination with means tending to open the automatic valve in the absence of normal pressure in the duct, and means adapted to be tripped by a connection convenient for actuation in an emergency for holding said automatic valve open.

7. A throttle and automatic valve mechanism for fluid-pressure motors having therein a casing, a manually movable throttle valve controlling a duct within the casing, and a trip-valve comprising a poppet adapted to close the duct controlled by the throttle, counterbalance means tending to lift the poppet off its seat, and means for causing fluid-pressure within the casing to overcome the effect of said counterbalance means in one position of the throttle-valve and means for locking the automatic valve against movement by such pressure.

8. A throttle and automatic valve mechanism for fluid pressure motors having therein a casing and a cylindrical hand-operated throttle controlling a passage in said casing, a valve seat within the seating area of said throttle and an automatic valve movable into and out of a free space within said throttle valve and thereby into and out of seating relation with said valve-seat, a stem for said automatic valve, and means reacting with said stem for opening said automatic valve in one position of said throttle valve, and means for holding said automatic valve in and releasing it from its open position.

9. In a throttle and automatic valve mechanism, a casing, a partition therein having an opening, valve seats surrounding said opening, and a plurality of valves each controlling said opening comprising a manually-operable throttle-valve adapted to seat upon one of said seats, and a fluid-pressure actuated valve adapted to seat upon the other of said seats, and having freedom of motion with respect to its seat when said throttle-valve is closed, and a trip mechanism for said fluid-pressure-actuated valve normally locking said valve open.

10. In a throttle and automatic valve mechanism, a casing, a partition therein having an opening, valve seats surrounding said opening, and a plurality of valves each controlling said opening comprising a manually-operable throttle valve adapted to seat upon one of said seats, and a fluid-pressure-actuated valve adapted to seat upon the other of said seats and having freedom of motion with respect to its seat when said throttle-valve is closed, said fluid-pressure-actuated valve having a stem extending without the casing, counterbalance means tending to move said stem to open said valve, and latch mechanism for holding said valve open.

11. A valve mechanism having therein a casing, a fluid-pressure actuated poppet-valve controlling an internal opening in said casing, a stem for said valve extending without said casing, a counter-weighted lever mounted on said casing and bearing on said stem, whereby to open said valve against gravity and light fluid pressures, and a latch for said lever adapted to hold said valve open against heavy fluid pressures, and to be tripped to allow said valve to close.

12. Flow-control mechanism having therein a throttle-casing, a cover for said casing, a throttle-valve in said casing, and a fluid pressure actuated trip-valve in said casing each controlling flow of fluid through the casing, the trip-valve having a stem extending through said cover, counterbalance means adapted to act on the trip-valve mounted on said cover, and a movable latch on said cover for holding said counterbalance means and trip-valve in one position.

13. Flow control mechanism having therein a throttle casing, a cover for said casing, a throttle-valve in said casing, and a trip-valve in said casing, each controlling flow of fluid through the casing, the trip-valve having a stem extending through said cover, counterbalance means adapted to act on the trip-valve mounted on said cover, and a movable latch on said cover for holding said counterbalance means and trip-valve in one position and means whereby said cover, counterbalance means and latch may be fastened in different rotative positions about said valve stem to accommodate different operating connections to said latch.

Signed by me at Boston, Massachusetts, this fifth day of February, 1919.

HERBERT B. MORRILL.